March 13, 1951

M. J. LANTZ 2,544,696

ALTERNATING CURRENT MEASURING
DEVICE AND METHOD
Filed Oct. 29, 1946

Martin J. Lantz INVENTOR.

BY
attorney.

Patented Mar. 13, 1951

2,544,696

UNITED STATES PATENT OFFICE

2,544,696

ALTERNATING CURRENT MEASURING DEVICE AND METHOD

Martin J. Lantz, Portland, Oreg., assignor to the United States of America as represented by the Secretary of the Interior Application October 29, 1946, Serial No. 706,497

9 Claims. (Cl. 171—95)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to an alternating current measuring device and more particularly to a method of, and means for, measuring and recording by means of magnetic links the short circuit current in an electric power system.

In electric power system operation short circuits are inevitable. It is desirable to measure and record the short circuit current so that the results may be analyzed. Such analysis permits a relatively quick location of the fault without the necessity of inspecting a large portion of the transmission line.

When a short circuit occurs in a power system the current normally increases in magnitude immediately. There is frequently in the initial portion of the short circuit current a high component of direct current which rapidly decays. Power lines are equipped with circuit breakers to open the affected circuits upon the occurrence of the abnormally high currents resulting from short circuits. The circuit breakers are controlled by fast acting relays sensitive to the high short circuit currents. The action of the protective relays and the circuit breakers is to interrupt the alternating current as it passes through a zero point and within a relatively few cycles after the occurrence of the fault.

The circuit breaker may accomplish the result of interrupting the current at a zero point in the alternating cycle by opening its contacts as soon as possible after the short occurs, the current continuing to flow for a few cycles through an arc drawn between the contacts. The arc then extinguishes as the current wave passes through zero. Extinction of the arc is aided by the lengthening distance between contacts as the breaker opens to its full extent and usually by an oil bath or other means.

The device that records the phenomena must be very rapid and positive in action. It must not interfere with the electrical characteristics of protective apparatus in the same circuit. To be extensively applied it must be inexpensive and fairly accurate. The oscillograph is the most accurate device for recording such currents, but it is too expensive for extensive use. The annunciator ammeter provides a limited amount of data but presents a high electrical burden to the circuit and does not have closely graduated steps of reading.

It has been proposed to use magnetic links to record short circuit currents. These magnetic links are small, normally demagnetized, magnetizable metal cores placed in a coil carrying a portion of the current to be measured and are magnetized by said current to provide a record of the measure thereof. However, such proposals have involved the use of rectifiers, complicated circuits, precision timing by relays and have resulted in a relatively high electrical burden on the measuring circuit.

It is an object of this invention to provide a simple, inexpensive means having no moving parts or mechanical inertia for measuring the short circuit current of an alternating current system.

It is a further object to provide a method for measuring by means of magnetic links short circuit current in an alternating current system.

It is a further object to provide a method of, and a means for, recording short circuit currents, said recording not being appreciably affected by any direct current components present in said short circuit current.

It is a further object to provide a method of and means for measuring approximately the dissymmetry of short circuit currents in alternating current systems just prior to the circuit interruption.

It is a further object to provide a device in which a large range of current values may be measured by means of magnetic links.

Other objects and advantages will become apparent from the following description taken in connection with the accompanying drawing, in which.

Figure 1:
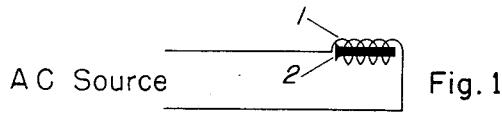
Fig. 1 is a schematic diagram showing the basic principles used by this invention.
Figure 4:
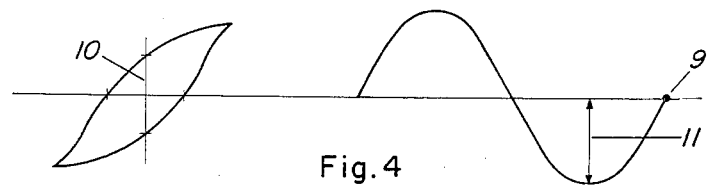
Fig. 4 shows a group of curves explaining the operation of the invention.

Referring now more particularly to Fig. 1, an alternating current line includes a coil 1 in the center of which is placed a demagnetized, magnetizable, metal core, or magnetic link 2. It is assumed that the alternating current line is protected by a circuit breaker controlled by protective relays to open the circuit on the occurrence of a short circuit. It is further assumed that the circuit interrupting device operates on the principle of current interruption at the zero point of the wave. As the alternating current flows through coil 1 the magnetism in magnetic link 2 will follow the well known hysteresis loop. If the alternating current is interrupted at the zero point 9 of the current wave shown in Fig. 4, then the residual magnetism, the value of which is shown at 10 in the hysteresis loop shown in Fig. 4, will be proportional to the peak magnitude 11 of the current wave shown in Fig. 4. After the current is interrupted, the magnetic link 2 will retain in its residual magnetism a durable record of the peak current of the last alternating cycle which passed through it. This peak current is the current interrupted by the circuit breaker.

The magnetized link 2 is then removed from coil 1 and its residual magnetism is measured by means of a surge crest ammeter. The surge crest ammeter has a moving coil carrying a needle. A magnetic field is supplied across said moving coil by unmagnetized mild iron pole pieces between which is placed the magnetized link. A fixed direct current is caused to flow through said moving coil. The indication of the surge crest volt meter is therefore a measure of the residual magnetism in the magnetic link. The short circuit current may be determined by comparing the measure of residual magnetism in the magnetic link with a calibration curve obtained by plotting the surge crest ammeter reading against the alternating current R. M. S. values. Since the short circuit current is now known, the distance down the line to the short circuit may easily be calculated by well known methods or determined from previously prepared curves. Such location of a fault may be accomplished by the use of precalculated or empirical curves of distance against short circuit current.

After the residual magnetism of the magnetic link has been measured, the link may be demagnetized by conventional means and replaced in the coil to record the next short circuit. To obtain substantially uninterrupted recording facilities, a spare demagnetized link may be inserted in the coil as the magnetized link is withdrawn for measurement.

Figure 2:
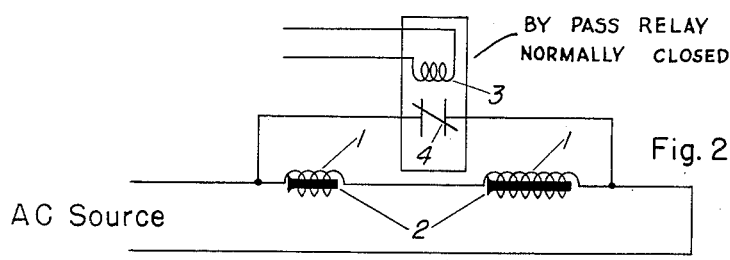
Fig. 2 is a schematic diagram showing one application of the invention.

If the short circuit current is asymmetrical and contains a direct current component, the magnetism of the link is affected and records a value which will not compare with a calculated or measured symmetrical value. The initial surge of direct current places an amount of magnetism in the link that cannot be wiped out by successive half cycles in an opposite direction. In Fig. 2 a high-speed by-pass relay is provided to eliminate as much as possible the effect of this direct current component upon the final reading. In Fig. 2, two coils 1—1 having different numbers of turns are used in series to provide measurement for different ranges of alternating current. A by-pass shunt path is provided in the alternating current line around coils 1—1 and through normally closed contacts 4 associated with relay coil 3. On the occurrence of the abnormally high currents of a short circuit, coil 3 is energized so that contacts 4 open about one cycle prior to the interrupting of the current by the circuit breaker. Since any direct current component present in the short circuit current normally decays during the initial existence of the short circuit current there is no appreciable direct current component in the final cycle of the current when contacts 4 open, the final cycle of alternating current passing through coils 1—1 to impress a measure thereof on links 2.

When the current is interrupted by a comparatively fast acting circuit breaker, the relay contacts 4 act to prevent the large initial component of direct current from affecting the magnetic links 1—1 at a time so adjacent the current interruption point that the effect of the direct current component is not wiped out by succeeding alternating cycles. However, when the circuit breaker is comparatively slow acting, the use of the by-pass relay is not necessary since the direct current component would have disappeared and its effect would have been wiped out. It will be obvious that, in some instances, by-pass relay contacts 4 might open at a time one cycle or more prior to just before the last cycle without entirely losing the advantage of the by-pass. As long as the by-pass relay contacts 4 keep the maximum current through the coils 1—1 to a value not appreciably higher than the magnitude of the final half cycle, the purpose of the by-pass is accomplished. The magnetic links 1—1 are in the electrical circuit, when used with the by-pass relay, only after said relay operates.

The effectiveness of the by-pass contacts 4 may be greatly increased by inserting 0.2 to 0.3 ohm in series with the link coils 1—1. This tends to direct the current to the relay contacts in case of appreciable contact resistance. A slight burden is then added to the circuit during the few cycles that contacts 4 are open. However, this would usually be of no consequence.

Figure 3:
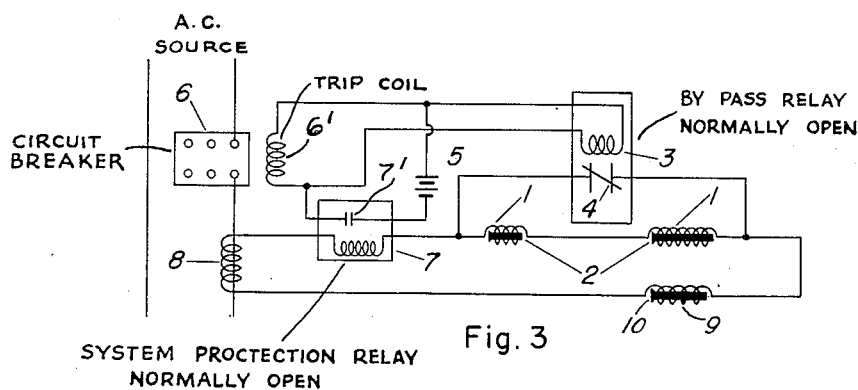
Fig. 3 is a schematic diagram showing a further application of the invention.

Fig. 3 shows the invention used in the secondary circuit of a current transformer. An oil circuit breaker 6 having an operating coil 6' is provided in the alternating current line. The secondary circuit of current transformer 8 contains coils 1—1 and the activating winding of protective relay 7. Coils 1—1 contain normally demagnetized magnetic links 2 and are by-passed by a shunt path containing normally closed contacts 4 associated with relay coil 3. Protective relay 7, has normally open contacts 7' connected in series with a battery 5, said contacts 7' and battery 5 being connected across coil 3 of the by-pass relay and also across the operating coil 6' of circuit breaker 6. Upon the occurrence of an abnormally high current in the alternating current line protective relay 7 closes its normally open contacts 7' to connect battery 5 to coil 3 of the relay containing normally closed contacts 4 and also serves to connect battery 5 to the operating coil 6' of circuit breaker 6 causing circuit breaker 6 to interrupt the current in the alternating line at a zero point in the alternating cycle and causing contacts 4 to open about one cycle prior to said interruption to impress a residual magnetism on links indicative of the peak of the last half cycle of current.

The coil 9 and the magnetic link 10 shown in Fig. 3 are provided for allowing the approximate measurement of wave dissymmetry during a short circuit current. A current proportionate to the fault current flows through coil 9 during the entire life of the fault as in the device shown in Fig. 1. Thus the magnetization of the link 10 in coil 9 is an indication not only of the alternating fault current but also of the initial direct current surge. Since the initial surge is by-passed around coils 1—1 by the relay contact 4, the magnetism retained by links 2—2 is indicative only of the alternating fault current. The ratio of the residual magnetism in the two links will give an approximation of the amount of dissymmetry present in the interrupted alternating current wave.

The device will also determine the type of short circuit by arranging links to measure each phase current and the residual current. If for instance, phase A link and the residual link are energized, the short circuit would be a phase A-to-ground fault.

It will be obvious to those skilled in the art that this invention provides a simple, inexpensive device for measuring short circuit current, or any alternating current interrupted by a circuit breaker, in alternating current lines. The device operates directly on alternating current eliminating the use of rectifiers. The device requires only one by-pass relay operation for higher speed breakers eliminating close timing adjustments between a plurality of relays. No by-pass relay is necessary for very slow speed breakers. The invention records the magnitude of the last half cycle of current which is approximately what the circuit breaker actually interrupts. The electrical burden on the circuit caused by the device is low compared to the burden presented by other devices achieving the same result. The device is so inexpensive and simple as to permit its extensive use.

What is claimed is:

1. An alternating current line containing a circuit breaker, an operating coil for causing said circuit breaker to interrupt the current in said alternatng current line inherently capable of interrupting the current passing therethrough only as it passes through zero magnitude, a current transformer associated with said alternating current line, said current transformer having a secondary circuit including a protective relay having normally open contacts and a coil within which is a normally demagnitzed magnetizable core, a by-pass relay having normally closed contacts shunting said coil containing said magnetizable link, a source of potential connected through the normally open contacts of said protective relay to said by-pass relay and said operating coil arranged to open said by-pass relay and said circuit breaker in sequence, thereby impressing on said core residual magnetism measurably proportional to the current in said line immediately prior to the current interruption.

2. A method of measuring by means of a normally demagnetized magnetizable link the peak of the last half cycle of an interrupted alternating current comprising the steps of applying to said link during the last cycle a magnetizing flux proportionate to the instantaneous value of said current, measuring the residual magnetism of said link to determine the peak current value of the last half cycle.

3. In combination, a line carrying alternating current, switch means in said line for opening said line at a zero point in the cycle of said alternating current, a coil in said line carrying a current proportionate to the current in said line, a normally demagnetized magnetizable link in said coil which becomes magnetized by said line current, the retained magnetism in said link after current interruption being functionally related in a known way to the line current whereby measurement of the retained magnetism provides indication of the magnitude of the current.

4. In combination, an alternating current line, a switch means in said line for opening said line at a zero point in the cycle of said alternating current, a coil connected in said line, a normally demagnetized magnetizable metal link in said coil.

5. For the measurement of currents in an alternating current system, a current transformer for producing a current proportional to said current, a coil in which said proportional current magnetizes a magnetically retentive material for record, a by-passing circuit containing an operable contact for by-passing said proportional current around said coil, a circuit breaker inherently capable of interrupting currents only at current zero, a relay arranged so said relay opens said by-passing circuit some time after the initial occurrence of said transient current, and opens said circuit breaker at a later time, leaving in said material magnetism having a known quantitative relationship to said current.

6. In combination, an alternating current line connected in series with a circuit breaker having an operating coil, said circuit breaker being of the type which operates to break the current as it passes through zero magnitude, a transformer connected to said alternating current line, said transformer having a secondary which is connected in series with the operating coil of a first relay and with a magnetizing coil in which is placed a normally demagnetized magnetic link, said first relay having normally open contacts which are connected in series with a source of electrical energy, a second relay having normally closed contacts which are connected in parallel with said magnetizing coil, said second relay having an operating coil, said operating coil of said circuit breaker and the operating coil of said second relay being connected in parallel and in series with the contacts of said first relay and said source of electrical energy.

7. The combination of claim 6, in which the first relay is adjusted to operate said circuit breaker a predetermined time after the occurence of an abnormally high current and in which the second relay is adjusted to open its normally closed contacts a short time after the occurrence of the abnormally high current but at least one cycle before the interruption of the current by the circuit breaker.

8. In an alternating current system, including an oil circuit breaker, the combination of a magnetizing coil, a magnetically retentive core in said coil, a relay whose contacts are normally closed short-circuiting said coil, current connections for exciting said coil proportionally to the current in said circuit breaker, means for opening the contacts of said relay, and means for opening said circuit breaker after opening the contacts of said relay.

9. In an alternating current system, including an oil circuit breaker, the combination of a magnetizing coil, a magnetically retentive core in said coil, a relay whose contacts are normally closed short-circuiting said coil, current connections for exciting said coil proportionally to the current in said circuit breaker, means for opening said circuit breaker and means for opening the contacts of said relay at least one-half cycle prior to the opening of said circuit breaker.

MARTIN J. LANTZ.

REFERENCES CITED

The following references are of record in the file of this patent:

UNITED STATES PATENTS

| Number | Name | Date |
| --- | --- | --- |
| 1,942,052 | Foust et al. | Jan. 2, 1934 |
| 1,942,065 | Lorraine | Jan. 2, 1934 |
| 1,942,384 | Foust | Jan. 2, 1934 |
| 1,959,053 | Goldsborough | May 15, 1934 |
| 1,975,065 | Menger | Sept. 25, 1934 |
| 2,295,312 | Wagner et al. | Sept. 8, 1942 |
| 2,376,808 | Ratz | May 22, 1945 |
| 2,434,933 | Kinyon et al. | Jan. 27, 1948 |